United States Patent Office 3,548,400
Patented Dec. 15, 1970

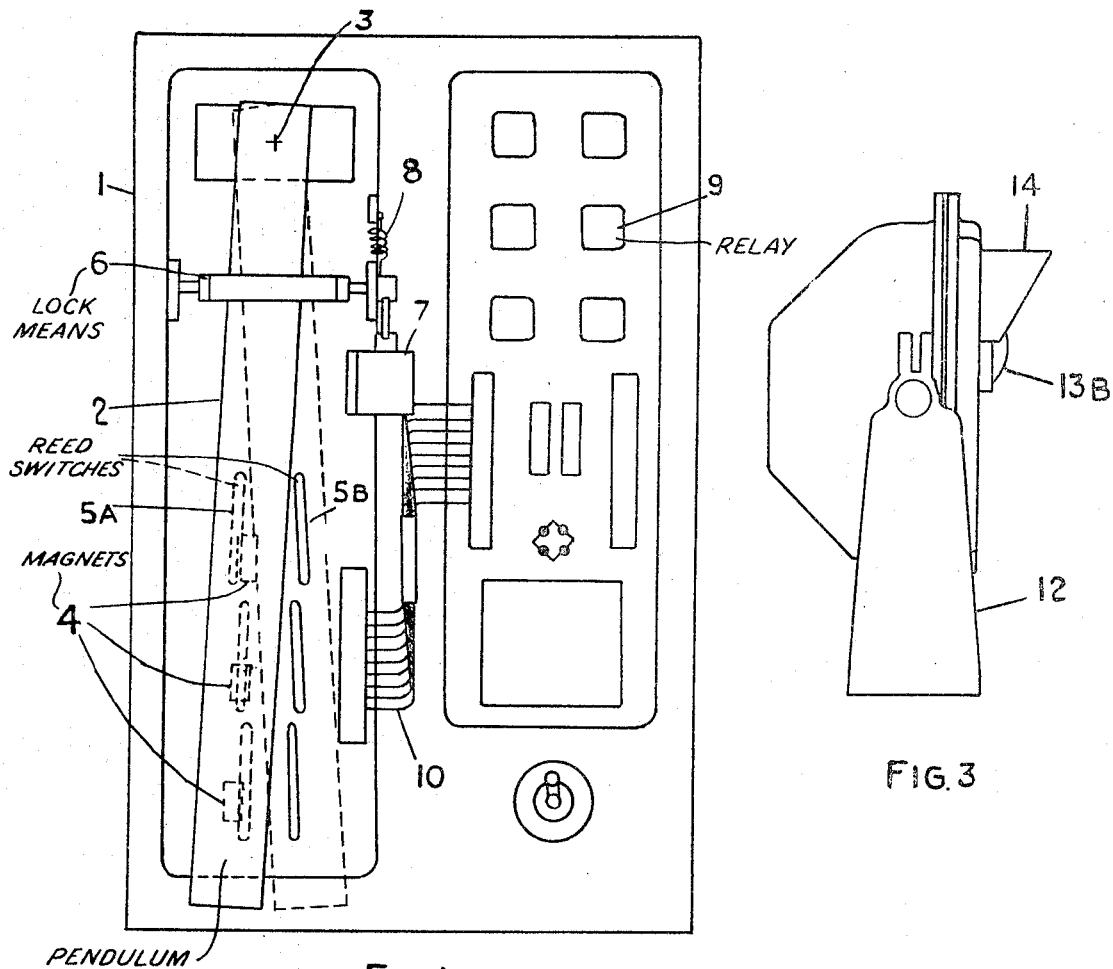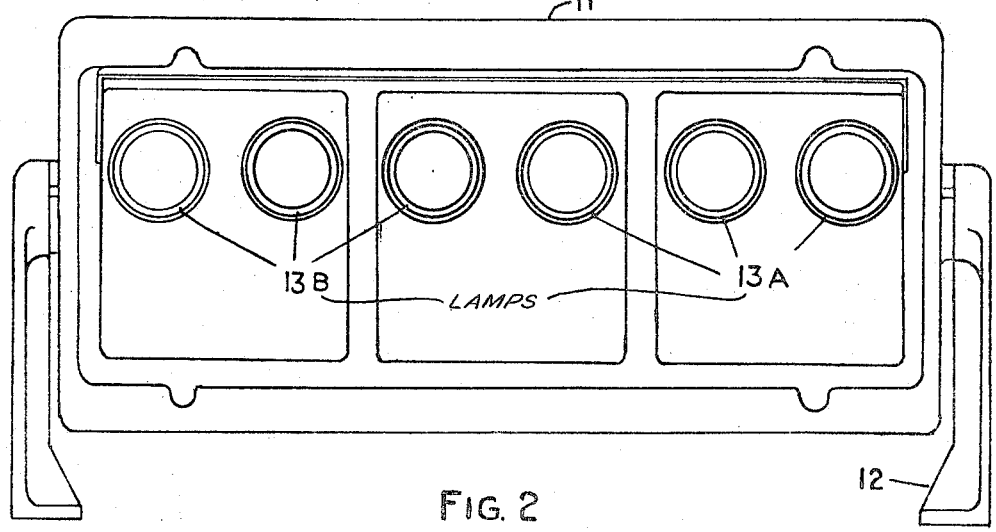

3,548,400
SHIP'S TRIM INDICATOR
Douglas Boyd, Killearn, and George James Brown, Glasgow, Scotland, assignors to Andrew Chalmers & Mitchell Limited, Glasgow, Scotland, a British company
Filed Sept. 29, 1967, Ser. No. 671,822
Int. Cl. G08b 21/00
U.S. Cl. 340—282　　　　　　　　　　　　　　4 Claims

ABSTRACT OF THE DISCLOSURE

A device for indicating listing of a ship includes a magnet-carrying pendulum, and a plurality of magnetically-operable switches mounted on each side of the pendulum in such positions that a predetermined swinging movement of the pendulum from a center position causes actuation of selected ones of the switches. The switches, in turn, control energization of magnetic relay controls for a warning device.

---

The subject of this invention is an indicator to show the trim of a ship and is particularly intended to indicate the trim during loading of the ship.

At present when a ship and particularly a cargo ship is being loaded the deck officer supervising the loading must watch continuously to ensure that the ship does not begin to list because of incorrect distribution of the cargo. Small angles of list are not readily apparent and the angle can become dangerous before it becomes obvious that correcting action is necessary. The problem so far has been to provide immediate and accurate indication that list is taking place, and of the amount of list and the direction, and to provide this indication at any convenient point on the ship. The device of the present invention is intended to give immediate visual and/or audible indication when a ship fitted with the device begins to list.

An indicator according to the invention including a pendulum carrying at least one permanent magnet, at least one magnetically-operable switch mounted on each side of the middle position of the pendulum in such a position that swinging movement of the pendulum through a predetermined angle of swing to one side or the other of the middle position brings the magnet on the pendulum into close enough proximity with one switch or the other to operate the respective switch, an electromagnetic relay operatively connected to each switch, and a warning device electrically connected to be controlled by the electro-magnetic relays.

The magnetically-operable switches may be of the dry reed type.

The indicator may incorporate a switch for switching off the electrical circuits, said switch being inter-locked with means for locking the pendulum in its middle position. The locking means for the pendulum may incorporate a shoe urged by a spring into engagement with the pendulum, said shoe being connected to a plunger movable in a solenoid coil connected in the electrical circuit of the indicator.

The warning device may incorporate lamps and/or an audible device such as a bell or a horn.

The indicator may incorporate several magnetically operable switches on each side of the middle position of the pendulum, each switch being connected to an associated electro-magnetic relay and each corresponding with a particular angle of list, each electro-magnetic relay controlling the circuit of a lamp. The lamps indicating list to port may be arranged to display red light and the lamps provided to indicate list to starboard may be arranged to display green light. The electric connections may be such that as list increases the lamps go in and out successively or as each successive lamp becomes illuminated the previous lamp remains also illuminated.

The casing may be of sheet or cast metal or of plastics material. It may be arranged to be weatherproof but this is not strictly necessary since the device can be arranged at any convenient point on the ship under cover, only the warning device being required to be seen or heard on deck.

A practical embodiment of the invention is illustrated in the accompanying drawings in which FIG. 1 shows semi-diagrammatically a pendulum device with the associated components disposed within a protective casing, FIG. 2 is a front elevation of an indicator lamp holder and FIG. 3 is an end elevation of the lamp holder.

In the drawing, 1 denotes the casing, 2 denotes a pendulum swingable about a pivot 3 and carrying three permanent magnets 4 on the centre line of the pendulum. 5A and 5B denote two sets of dry reed switches, the switches of each set being offset from one another so that each succeeding switch is further away from the vertical line passing through the pivot 3 than the preceding switch, the angular amount by which each switch is displaced from said vertical line corresponding with a chosen degree of list, the two sets of switches representing list to one side and the other of the centre line. As the pendulum swings the permanent magnets 4 on the pendulum pass successively over the switches of one set or the other. 6 denotes a locking means for the pendulum 2, the locking means consisting of a shoe operable by a solenoid device 7 connected into the electrical circuit in such wise that when the electrical circuit is energized the solenoid 7 operates to withdraw the shoe against a spring 8 and when current to the device is switched off the spring 8 causes the shoe to be applied to hold the pendulum against swinging movement. 9 denotes electro-magnetic relays connected by wiring 10 to the switches 5A and 5B, the relays 9 being operable when energized to switch operating current to indicating lamps. Referring to FIGS. 2 and 3, 11 denotes a casing pivoted on supports 12 and carrying two sets of lamps 13A and 13B, the lamps being electrically connected to the appropriate relays 9. 14 denotes a hood masking the lamps to render them more easily seen in daylight.

In practice, the indicator casing 1 is fixed to a portion of the ship in such wise that the axis of the pivot 3 is on the vertical plane containing the fore and aft centre line of the ship when the ship is on an even keel. When current is switched to the electrical circuit of the device the solenoid 7 is energized and withdraws the locking device from the pendulum 2 in opposition to the spring 8 so that the pendulum 2 is free to swing about the pivot 3. When the ship is not listing the pendulum 2 is in its middle position and none of the permanent magnets 4 on the pendulum is near enough any of the switches 5A or 5B to cause the switches 5A or 5B to be actuated. None of the indicator lamps 13A or 13B is thus caused to be illuminated. If the ship should develop a list the pendulum will swing towards the lowermost side and in the construction illustrated the lowermost permanent magnet 4 will go over the lowermost switch 5A or 5B depending on the side to which the ship is listing, this action occurring when a predetermined degree of list corresponding with the first increment of list for which warning is to be given occurs. When the switch is actuated it causes the corresponding one of the relays 9 to be energized and this relay in turn switches current to the first lamp 13A or 13B of the series which gives a visual indication that list is occurring of an amount corresponding with the first increment of list for which the device is calibrated. If the list of the ship continues to increase the middle permanent magnet on the pendulum ultimately comes into sufficient proximity with the middle switch of the set 5A or 5B and actuates the switch thereby causing a corresponding relay 9 to be energized and to switch current to the next lamp 13A or 13B. According to how the circuits are arranged the previously illuminated lamp may remain illuminated or may be switched out. Further listing movement of the ship to the same side will bring the uppermost permanent magnet on the pendulum into proximity with the uppermost switch of the set 5A or 5B and by way of the appropriate relay 9 will cause the end lamp 13A or 13B to be illuminated. As an example the indicator may be set to indicate list in increments of ½°.

By the device indicated the deck officer in charge of loading can see immediately not only that the ship is listing but to what side and to what extent and can take immediate corrective action.

What is claimed is:

1. A ship's trim indicator comprising a pendulum, a plurality of magnets mounted on the pendulum spaced from one another longitudinally of the pendulum, a plurality of magnetically-operable proximity switches fixed on each side of the middle position of the pendulum in tier in a plane parallel with and spaced from the plane of swing of the pendulum, said switches being located in such positions that angular displacement of the pendulum through any one of several predetermined angles of swing to one side or the other of the middle position of the pendulum brings a magnet on the pendulum into operative proximity with a switch coresponding with one of the predetermined angles of swing, an electro-magnetic relay operatively connected to each switch, and a warning device electrically connected to be controlled by the electro-magnetic relays.

2. An indicator as claimed in claim 1 further comprising a locking means for the pendulum engageable with the pendulum, a spring urging the locking means into engagement with the pendulum, and electro-magnetic means coupled to the locking means for, when energized, withdrawing the locking means in opposition to the spring.

3. An indicator as claimed in claim 2 in which the magnetically-operable switches are of the dry reed type.

4. An indicator as claimed in claim 1 in which the magnetically-operable switches are of the dry reed type.

References Cited

UNITED STATES PATENTS

| | | | |
|---|---|---|---|
| 2,802,204 | 8/1957 | Kennelly et al. | 340—261 |
| 3,068,333 | 12/1962 | Hewitt, Jr. | 335—153 |
| 3,073,922 | 1/1963 | Miller | 200—61.52 |
| 3,161,739 | 12/1964 | Suozzo | 200—61.52 |

THOMAS B. HABECKER, Primary Examiner

J. M. BOBBITT, Assistant Examiner

U.S. Cl. X.R.

335—206, 207; 200—61.52; 340—226